United States Patent
Yokota et al.

(10) Patent No.: US 8,395,804 B2
(45) Date of Patent: Mar. 12, 2013

(54) RFID REGISTRATION SYSTEM AND METHOD THEREOF

(75) Inventors: Toshimi Yokota, Hitachiota (JP); Ryosuke Shigemi, Hitachi (JP); Ryota Arai, Hitachinaka (JP); Shinya Yuda, Hitachi (JP); Munetoshi Unuma, Hitachinaka (JP); Kozo Nakamura, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 247 days.

(21) Appl. No.: 12/820,226

(22) Filed: Jun. 22, 2010

(65) Prior Publication Data

US 2010/0321736 A1 Dec. 23, 2010

(30) Foreign Application Priority Data

Jun. 23, 2009 (JP) .................... 2009-148190

(51) Int. Cl.
- G06K 15/00 (2006.01)
- G06K 7/10 (2006.01)
- G08B 13/14 (2006.01)
- G11C 7/00 (2006.01)

(52) U.S. Cl. .......... 358/1.16; 358/1.18; 340/572.1; 365/192; 235/462.46

(58) Field of Classification Search .......... None
See application file for complete search history.

(56) References Cited

U.S. PATENT DOCUMENTS

| | | | |
|---|---|---|---|
| 7,568,936 B2 | 8/2009 | Shigemi et al. | |
| 2007/0102505 A1 | 5/2007 | Yokota et al. | |
| 2007/0109389 A1 * | 5/2007 | Slatter | 347/105 |
| 2007/0120684 A1 | 5/2007 | Utaka et al. | |
| 2009/0138303 A1 * | 5/2009 | Seshadri | 705/7 |
| 2009/0269967 A1 | 10/2009 | Shigemi et al. | |

FOREIGN PATENT DOCUMENTS

| | | |
|---|---|---|
| JP | 2006-011422 | 1/2006 |
| JP | 2007-147356 | 6/2007 |
| JP | 2007-151383 | 6/2007 |

OTHER PUBLICATIONS

U.S. Appl. No. 12/646,996, filed Dec. 24, 2009, Yokota, et al.

* cited by examiner

*Primary Examiner* — Thomas Lett

(74) *Attorney, Agent, or Firm* — Antonelli, Terry, Stout & Kraus, LLP.

(57) ABSTRACT

A RFID registration system is provided with a reader for reading an ID of an object to be identified by an RFID, an RFID existence position indicating the position of the RFID, and the RFID; an associating apparatus for associating the read RFID with the ID of the object to be identified by the RFID, a position information generation apparatus for obtaining the read position at the same time the position has been read, and a collation apparatus for obtaining an ID of the object to be identified by the RFID based on the read position and the RFID existence position. The RFID registration system can be avoid making the mistaken association between the RFID and the object to which the identification ID is attached.

9 Claims, 9 Drawing Sheets

- PRINTING REFERENCE POINTS — S11
- PRESSING DOWN REFERENCE POINTS — S12
- INPUTING PRESSED REFERENCE POINTS — S13
- OBTAINING AFFINE TRANSFORMATION FUNCTION TO CONVERT PRESSED REFERENCE POINTS AND COORDINATES IN LIST 6 — S14

RFID REGISTRATION SYSTEM AND METHOD THEREOF

CLAIM OF PRIORITY

The present application claims priority from Japanese Patent application serial no. 2009-148190, filed on Jun. 23, 2009, the content of which is hereby incorporated by reference into this application.

BACKGROUND OF THE INVENTION

1. Technical Field

The present invention relates to an RFID registration system and method thereof.

2. Background Art

The use of Radio Frequency Identification (hereinafter, referred to as RFID) is becoming popular. This is because attaching an RFID to an object and associating the RFID with an identification ID on an application of the object will enable the object to be reliably identified and necessary information to be quickly retrieved, thereby increasing reliability and efficiency.

For example, in a cable connection support application, an RFID is attached to a cable wire and a wire number of design data is associated with the RFID. In the same manner, an RFID is attached to a terminal of terminal block and a terminal number of design data is associated with the RFID. By doing so, it is possible to determine whether the connection is in accordance with the design by reading the RFID of the cable wire and the RFID of the terminal in pairs and collating the connections of the cable wire and the terminal with the connection design data.

For the preparation to obtain those effects, it is necessary to associate the RFID with the identification ID on the application of the object. Japanese Patent Laid-Open No. 2007-147356 discloses a method of relating an RFID to an identification ID of an application of an object. The RFID is attached to a pipe, a bar-code is attached to the RFID mounting position on the pipe, shown in the piping diagram, and the RFID and the bar-code associated each other are registered. That is, by an ID (bar-code) of an object to be identified by an RFID, the RFID existence position indicating the position of the above RFID (the piping position=the bar-code position shown in the piping diagram), an apparatus (reader) for reading the above RFID, and an apparatus for relating the read RFID to the ID of the object to be identified by the RFID, the RFID is associated with the identification ID (bar-code) on the application of the object.

A RFID registration method of a cable connection support system is disclosed in Japanese Patent Laid-open No. 2007-151383. In this system, an RFID is attached to a cable wire and the RFID is associated with a wire number of design data, and in the same manner, an RFID is attached to a terminal of a terminal block and the RFID is associated with a terminal number of design data. By doing so, it is possible to automatically determine by the system whether the connection is in accordance with the design by reading the RFID of the cable wire and the RFID of the terminal in pairs and automatically collating the connections of the cable wire and the terminal with the connection design data.

Prior Art Literatures

[Patent Literatures]
Patent Literature 1: Japanese Patent Laid-open No. 2007-147356
Patent Literature 2: Japanese Patent Laid-open No. 2007-151383

SUMMARY OF THE INVENTION

Problem for Solving by the Invention

The problem to be solved by the present invention is to prevent a human error from occurring so that incorrect relation will not be made when relating an RFID to a unique identification ID of the object to which the RFID is attached. Since it is a person who operates a reader, in the prior art, there is a possibility that a tag of an incorrect position could be read and associated with a bar-code. As a result, when an RFID attached to the object is read by a reader, incorrect information can be indicated, resulting in the implementation of incorrect work.

Means for Solving the Problem

A feature of the present invention to solve the above problem is to provide a system comprising an apparatus for reading and obtaining a read position; and an apparatus for obtaining an ID of the object to be identified by the RFID based on the read position and a RFID existence position.

Advantageous Effect of the Invention

According to a RFID registration system of the present invention, it is possible to avoid relating a wrong pair, thereby increasing the reliability.

DETAILED DESCRIPTION OF THE PREFERRED EMBODIMENTS

Hereafter, with reference to drawings, embodiments of the present invention will be described. Herein, an RFID is a tag having unique identification information.

[Embodiment 1]

A RFID registration system according to Embodiment 1, which is a preferable one embodiment of the present invention, will be described with reference to FIG. 1. In the RFID registration system of the present embodiment, automatic collation, and an automatic determination of whether the connection is in accordance with the design is executed For the preparation to obtain those effects (automatic collation, automatic determination of whether the connection is in accordance with the design), it is necessary to create a [Wire number, RFID] list that associates an RFID to be attached to a cable wire with a wire number of design data. In the same manner, it is necessary to create a [Terminal number, RFID] list that associates an RFID to be attached to a terminal with a terminal number of design data. Hereafter, a [Wire number, RFID] list will be described as an example, and the same procedure is applied to the terminal number. The [Terminal number, RFID] list is stored in a list data holding section 8 and the [Wire number, RFID] list is stored in a list data holding section 9. Those lists may be stored in the same data holding section.

There are two kinds of RFID registration procedures, and either one can be used according to an application.

(a) Post-Attachment Registration System

An RFID is attached to each wire, and the attaching condition is recorded in the [Wire number, RFID] list.

(b) Post-Registration Attachment System

A combination of an RFID and a wire is beforehand determined creating a [Wire number, RFID] list, and the RFID is attached to the specified wire according to the list. For example, when a conduct number is printed on an RFID, the printed RFID can be attached to the corresponding wire, accordingly, this procedure is more advantageous.

Figure 1:
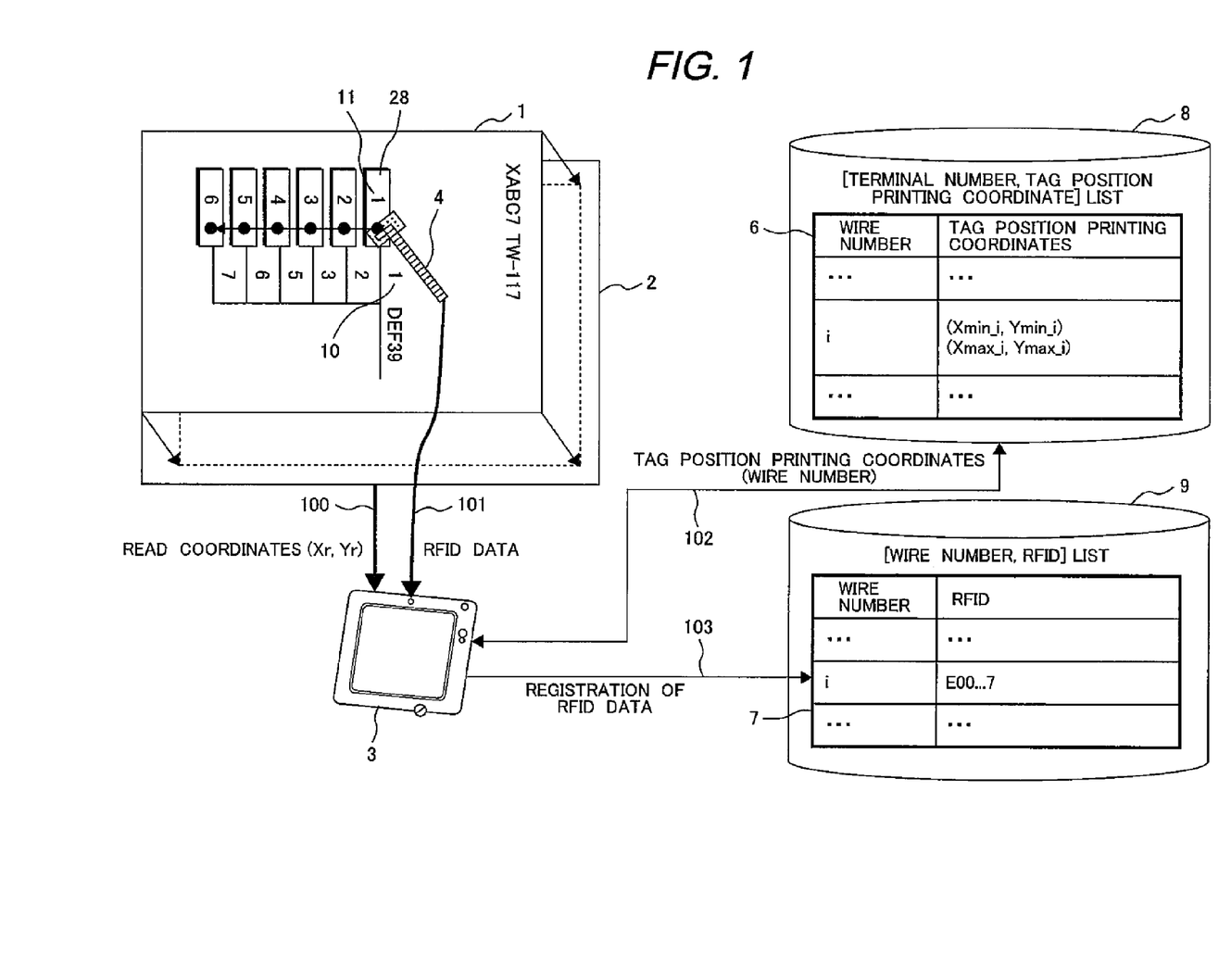
FIG. 1 is a structural diagram showing an overview of a RFID registration system according to Embodiment 1, which is a preferable one embodiment of the present invention.

FIG. 1 shows a structure of a RFID registration system for realizing an RFID registration method that is considered as the post-attachment registration system. The purpose is to make a [Wire number, RFID] list 7 that associates each cable wire with an RFID to be attached by registering the RFID.

In the initial state of the [Wire number, RFID] list 7, a wire number is provided as an ID of an object to be identified by an RFID and an initial value is provided for the RFID value, thereby creating the [Wire number, RFID=initial value] list. Because a wire number has been associated with a terminal number according to design data, a terminal number may be used as an ID of the object to be identified by the RFID.

Instruction information to specify a cable wire and the corresponding RFID to be attached is printed on a base sheet 1. Each RFID to be attached to a specified wire is pasted on the predetermined position with double-faced adhesive tape or glue. A wire number 10 is printed on an RFID to visually facilitate the work procedure. The RFID existence position (tag position printing coordinates) indicating the position of the above RFID that is the predetermined position where the RFID is affixed to an associated wire is defined in the [Terminal number, tag position printing coordinate] list 6.

A reader 4 is an apparatus for reading the above RFID. An apparatus (associating section 34) for associating a value (for example, ID) of an RFID read by a personal computer (PC) 3 with an ID of the object to be identified by the RFID registers the value of the RFID read by the reader 4 in the [Wire number, RFID] list 7 together with the wire number which is an ID of the object to be identified by the RFID.

A tablet 2 is an apparatus (a position information generation apparatus) for obtaining a read position simultaneously when an RFID is read by the reader 4. Herein, the tablet 2 such as a pressure-sensitive tablet is used and installed under the base sheet 1. When reading an RFID by a reader 4, the read RFID position can be obtained by pressing the reader on the RFID. Other than the pressure-sensitive tablet, other types of tablets, such as an infrared tablet, capacitance type tablet, or the like, can be used. Furthermore, the position of the reader 4 can be obtained by photographing in a fixed camera image, attaching a gyro sensor to the reader, or by using a GPS or wireless communication.

When receiving a value (for example, ID) of an RFID that has been read by the reader 4 and transmitted via a signal line 101, an apparatus (position collation section 37) for obtaining an ID of the object to be identified by the RFID based on the position that has been read by the reader 4 and the RFID existence location simultaneously obtains the position (Xr, Yr) of the reader 4 from the tablet 2 via a signal line 100. Then, this apparatus searches a wire number that includes (Xr,Yr) in the tag position printing coordinates in the [Terminal number, tag position printing coordinate] list 6 and sends the corresponding wire number and the read RFID to the apparatus for associating.

Figure 2:
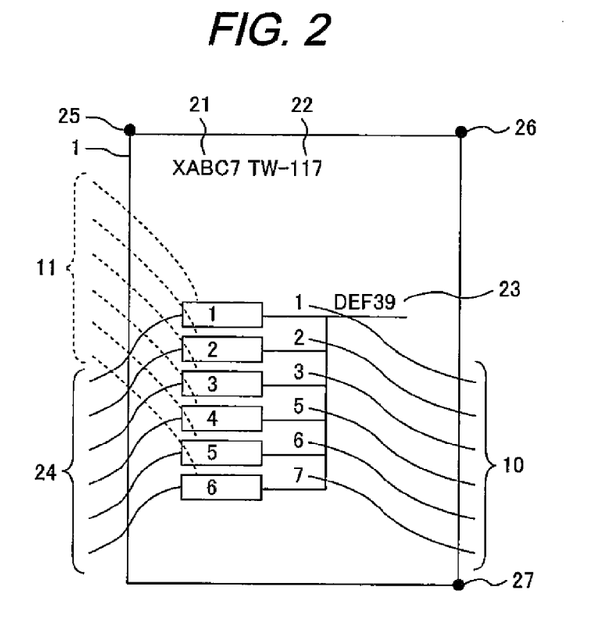
FIG. 2 is an explanatory view showing an example of a base sheet printed, which is used in Embodiment 1.
Figure 3:
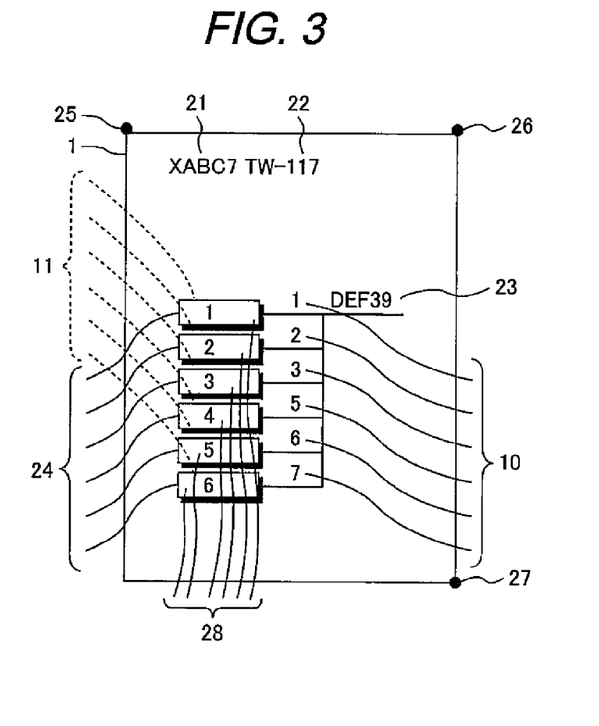
FIG. 3 is an explanatory view showing an example where an RFID tag is affixed to a base sheet in Embodiment 1.

FIG. 2 shows an example of the base sheet 1 in FIG. 1. As information required for instructions to an operator, there are described a panel number 21, terminal block number 22, cable number 23, wire number 10 indicating that the cable includes seven wires, terminal number 11 printed on the RFID to be attached, and a tag position instruction frame 24 indicating the attaching position, on the base sheet 1. The tag position instruction frame to print the above information is defined in the [Terminal number, tag position printing coordinate] list 6. The reason why reference points 25 to 27 are also printed will be explained by using FIG. 6 later. FIG. 3 shows the condition where RFID tags 28 having a terminal number printed have been attached to the tag position instruction frame 24 shown in FIG. 2.

Figure 4:
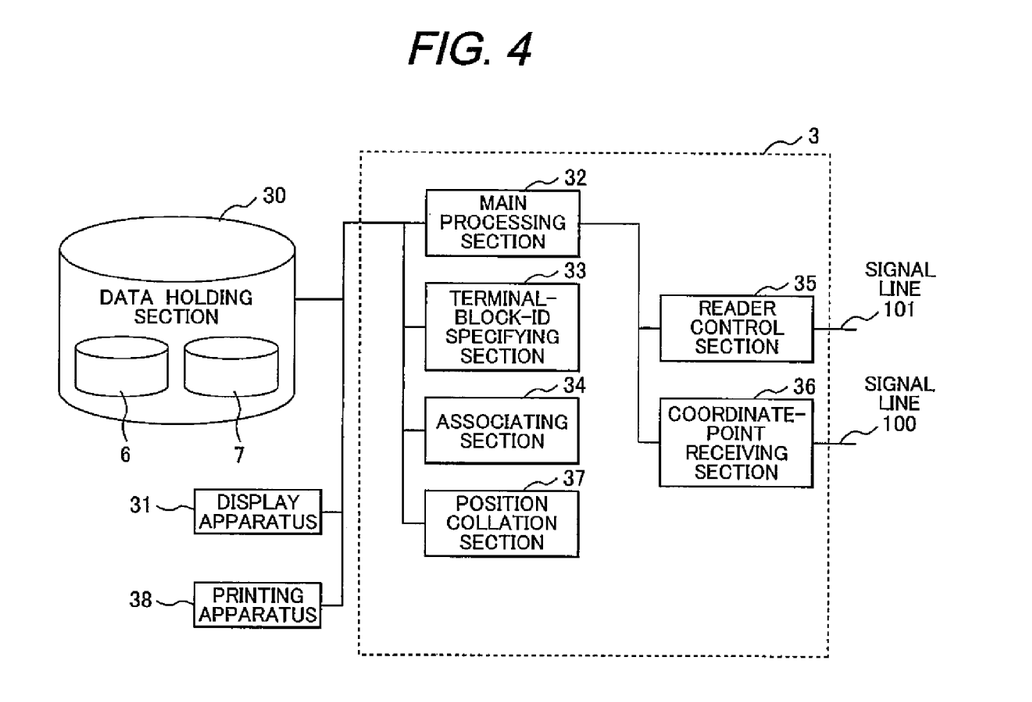
FIG. 4 is a detail structural diagram showing a RFID registration system shown in FIG. 1.

FIG. 4 shows a detail structure of the RFID registration system, that is, the configuration of the inside and the periphery of the personal computer 3 shown in FIG. 1.

A data holding section 30 has the list data holding section 8 holding the [Terminal number, tag position printing coordinate] list 6 and the list data holding section 9 holding the [Wire number, RFID] list 7. In this embodiment, the data holding section may directly store the [Terminal number, tag position printing coordinate] list 6 and the [Wire number, RFID] list 7 without the list data holding section 8 and 9.

A display apparatus 31 displays the RFID registration program on a display screen. Although the data holding section 30 and the display apparatus 31 are designed to be located outside the personal computer 3, they can be located inside the personal computer 3.

A main processing section 32 executes main processing of the system. In the main processing, start of the program is accepted, and when there is another menu, the specification of the menu is accepted, and then the processing of the program will proceed to the RFID registration menu.

A terminal-block-ID specifying section 33 inputs information specifying the terminal block ID for which an RFID is going to be registered. That is, terminal-block-ID specifying section 33 inputs the panel number 21 and the terminal block number 22, and searches the corresponding panel number 21 and terminal block number 22 in the [Terminal number, tag position printing coordinate] list 6 and the [Wire number, RFID] list 7. In this procedure, if the value of the RFID in the [Wire number, RFID] list 7 is not the initial value, by displaying the warning indicating "already registered" on the display screen of the display apparatus 31, it is possible to avoid incorrect operations. If the system is designed so that RFID registration operation is accepted for each panel or for each terminal block number 22, the operator can conduct operation procedure without confusion. If pages of the base sheet 1 shown in FIG. 3 are divided for each processing unit, operation procedures are easily conducted. Furthermore, when the panel number 21 and the terminal block number 22 is inputted, there is a concern that incorrect input or lingering input may occur because the panel numbers 21 and the terminal block numbers 22 tend to be continuous numbers, names are similar, and occasionally the name is long. Accordingly, it can be configured such that a several-digit number has been assigned to a terminal block number 22 as an ID, and the terminal-block-ID specifying section 33 inputs the ID, displays the corresponding panel number 21 and the terminal block number 22, and then accepts the entry made by the operator by pressing a confirmation button. If a three-digit alpha-numeral is used, the cubic of (26+10) kinds of base sheets 1 can be identified. Alternately, it is possible to attach a bar-code or an RFID to the base sheet 1 as an ID and read it by a reader 4.

When receiving the RFID read by the reader 4 from the reader control section 35 and also receiving the coordinates (Xr,Yr) read by the tablet 2 from the coordinate-point receiving section 36, the associating section 34 sends the coordinates (Xr,Yr) to the position collation section 37.

The reader control section 35 controls the reader 4.

The coordinate-point receiving section 36 receives the position read by the reader 4 from the tablet 1.

The position collation section 37 checks the tag position printing coordinates in the [Terminal number, tag position printing coordinate] list 6 which includes the coordinates (Xr,Yr) and returns the wire number i of the corresponding area to the associating section 34. When the associating section 34 receives the wire number i from the position collation section 37, it rewrites the RFID value (a value of an ID stored in a tag 28) that corresponds to the wire number i in the [Wire number, RFID] list 7 to the RFID read by the reader 4. Incidentally, the initial value of the [Wire number, RFID] list 7 is a [Wire number, RFID=initial value].

Figure 5:
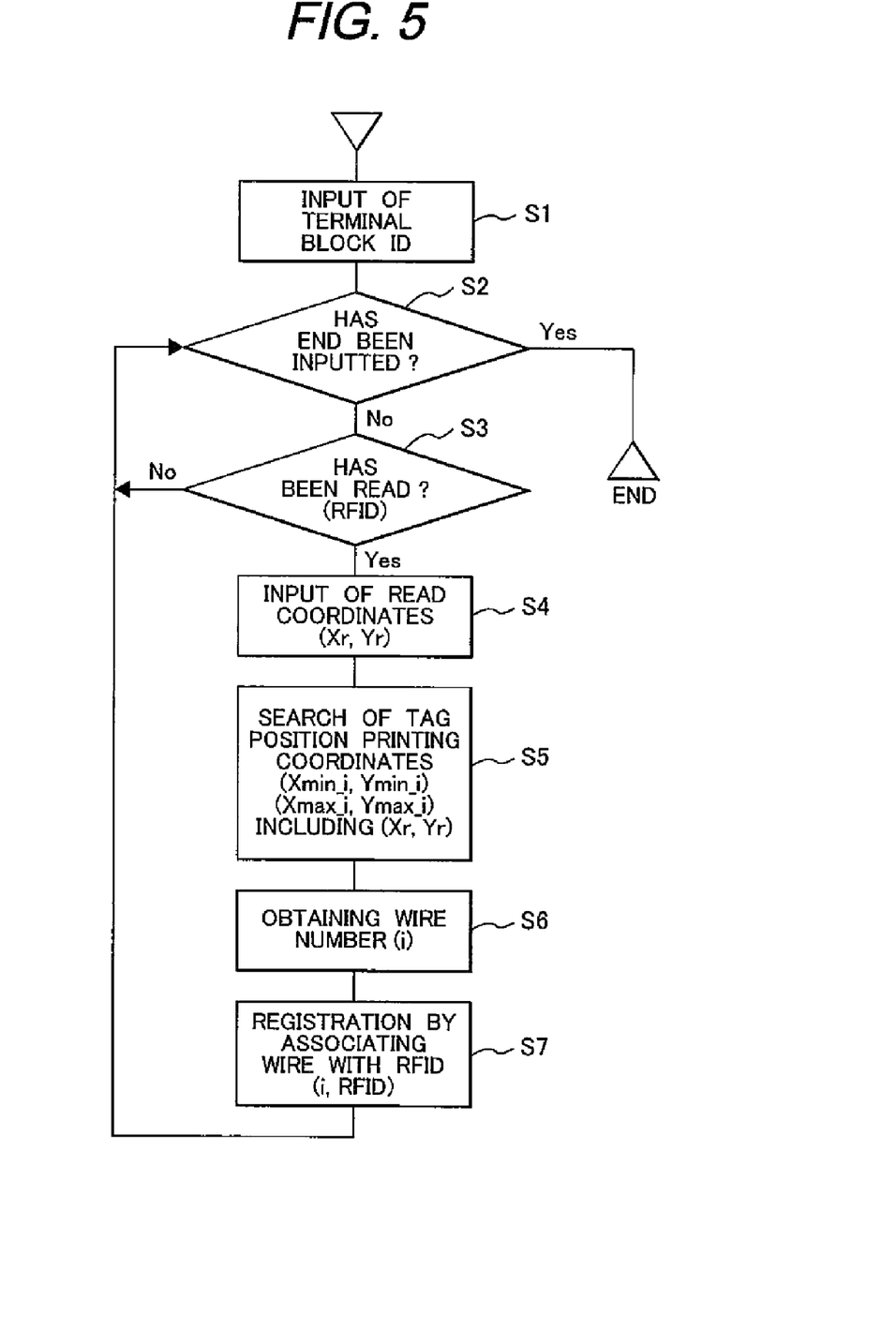
FIG. 5 is a flowchart showing a process of registering an RFID in Embodiment 1.

FIG. 5 shows a process of registering an RFID, which is performed by the RFID registration system shown in FIG. 4.

In step S1, the terminal-block-ID specifying section 33 inputs a terminal block ID.

In step S2, it is checked whether the terminal-block-ID specifying section 33 accepted end information. When values of RFIDs, which are attached on the base sheet 1, have been read by the reader 4 and have been registered for all of the wires connected to the terminal block 1, the terminal-block-ID specifying section 33 generates the end information. When the end information was generated, the terminal-block-ID specifying section 33 determines that the end information was accepted. Alternately, an end button is prepared, and when the end button is pressed by operator who looked information that the RFIDs have been registered for all of the wires connected to the terminal block, displayed on the display apparatus 31, the terminal-block-ID specifying section 33 inputs the end signal from the end button, and determines that the end signal was inputted.

In step S3, the associating section 34 confirms that the RFID has been read, by receiving the RFID read by a reader 4 is received.

In step S4, the associating section 34 inputs the read coordinates (Xr,Yr) that have been read by the tablet 2 from the coordinate-point receiving section 36. The tablet coordinates that have been read within a certain time may be used as the inputted coordinates (Xr,Yr). The coordinates that have been read by the tablet 2 right before may also be used as the inputted coordinates (Xr,Yr). However, to distinguish the coordinates from the coordinate point of the position that has been read right before, the coordinate point after one or more pen-ups have been conducted after the immediate read is used. The read coordinates (Xr,Yr) are then transmitted to the position collation section 35.

In step S5, the position collation section 37 searches for the tag position printing coordinates, which includes the read coordinates (Xr,Yr) sent from the associating section 34, from the list related to the corresponding terminal block in the [Terminal number, tag position printing coordinate] list 6. The tag position printing coordinates may be indicated by two points, (Xmin_i,Ymin_i)(Xmax_i,Ymax_i), diagonally located in a rectangle of the tag position.

In step S6, the position collation section 37 obtains the wire number i associated with the tag position printing coordinates, (Xmin_i,Ymin_i)(Xmax_i,Ymax_i), searched in the step S5. Subsequently, the position collation section 37 transmits the wire number i associated with the tag position printing coordinates to the associating section 34.

In step S7, the associating section 34 associates the wire number i with the value of the RFID read in the step S3 and rewrites the value of the RFID that corresponds to the wire number i in the [Wire number, RFID] list 7.

By doing so, it is possible to create a [Wire number, RFID] list 7 that associates each cable wire with an RFID to be attached to each cable wire. Because a pair of the wire number and the value of the RFID is created based on the read RFID position, it is possible to avoid making incorrect pairs, thereby increasing reliability and preventing human errors of the RFID registration system.

Figure 6:
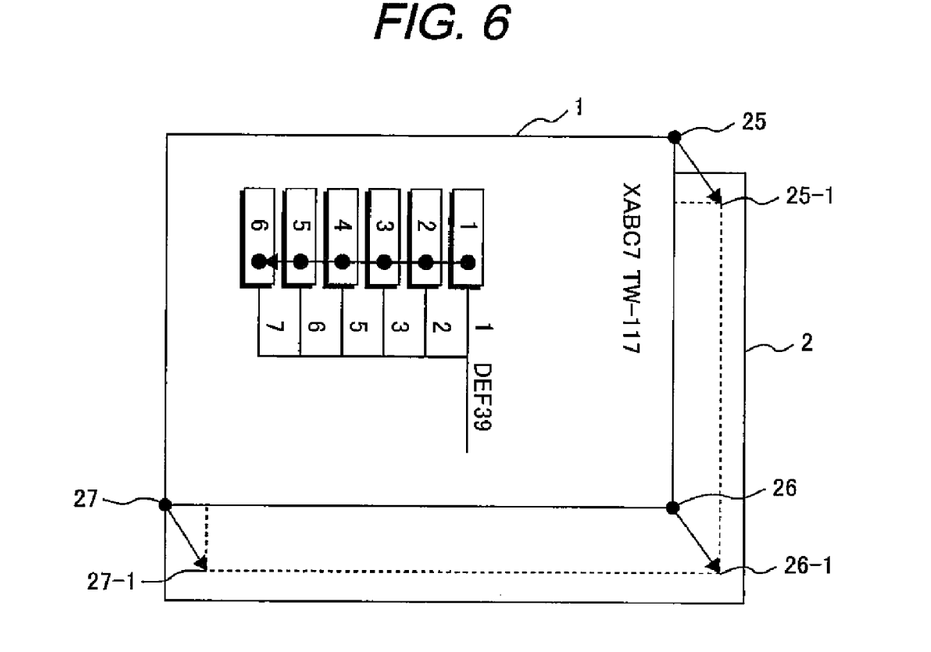
FIG. 6 is an explanatory view showing a position alignment process executed by a position collation section.

FIG. 6 shows an example of the position alignment operation executed by the position collation section 37. when the tag position specification frame is printed by a printing apparatus 38 by referring to the [Terminal number, tag position printing coordinate] list 6 as shown in FIG. 2, there is a concern that deviation of the position may occur depending on the printer. Furthermore, if the position of the base sheet 1 is deviated when the base sheet 1 is superposed on the tablet 2, the position of the reader 4 detected by the tablet 2 differs from the value in the [Terminal number, tag position printing coordinate] list 6. Accordingly, to avoid this situation, the coordinates of the base sheet 1 are aligned with the coordinates of the tablet 2. This is made possible by executing the following procedure. First, as shown in FIG. 2, when printing the base sheet 1, reference points 25 to 27 are printed on the base sheet 1. The coordinates of the reference points are the same as those of the coordinate system in the [Terminal number, tag position printing coordinate] list 6. Then, when the base sheet 1 is superposed on the tablet 2 to register the value of the RFID, before the RFID is read by a reader 4 for registration, the coordinate points 25-1 to 27-1 of the tablet 2 are obtained by pressing the reference points 25 to 27 on the base sheet 1. Because the reference points of a coordinate system in [Terminal number, tag position printing coordinate] list 6 correspond to the coordinate points 25-1 to 27-1 of the coordinate system for the tablet 2, the affine transformation function is obtained to convert the coordinate points 25-1 to 27-1 into the reference points 25 to 27. When the position collation section 37 has obtained the read coordinates (Xr, Yr), the position is collated by using the coordinate point (Xr', Yr') that has been obtained by conversion using the affine transformation function. The affine transformation function can be obtained every time the base sheet 1 is changed before step S2 in FIG. 5, or after the program has been started, or it can be obtained by an operator by selecting the procedure from the menu whenever necessary.

If the position of the base sheet 1 is deviated from that of the tablet 2 after those positions have been aligned, this function does not operate properly. Accordingly, a guide frame may be provided so that when a base sheet 1 is placed along the guide, the reference point is positioned in a predetermined position. A base sheet retainer may be mounted to an upper part of the guide frame so that it covers the part of the base sheet 1. By this configuration, even if the position specification frame is deviated due to printing, reliable operation can be conducted.

Figure 7:
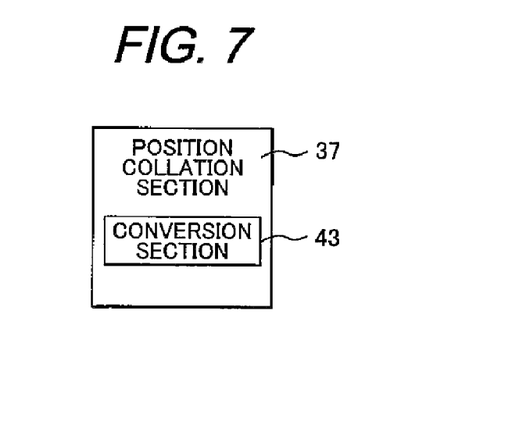
FIG. 7 is a detail structural diagram showing a position collation section for executing a position alignment process.

FIG. 7 shows a detail structure of the position collation section 37 for executing a position alignment process. The position collation section 37 includes a conversion section 43 which uses the affine transformation function to associate the reference point of the coordinate system in the [Terminal number, tag position printing coordinate] list 6 with the read coordinates entered from the tablet 2.

Figure 8:
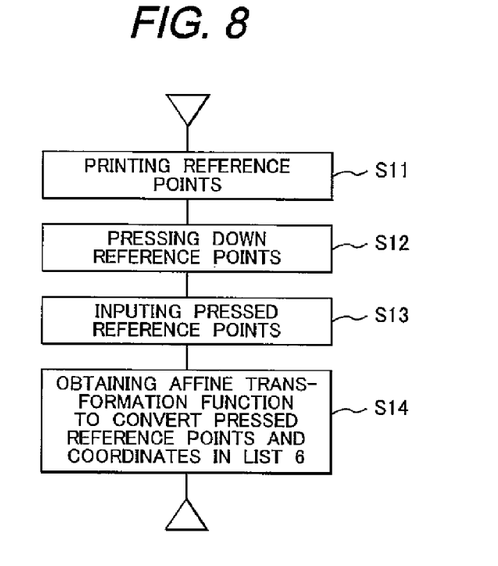
FIG. 8 is a flowchart showing a process for associating a reference point with a read coordinates inputted from a tablet.

FIG. 8 shows a process for associating a reference point with a read coordinates inputted from a tablet 2.

In step S11, the printing apparatus 38 prints the reference points.

In step S12, the reference points are pressed manually by an operator.

In step S13, the position collation section 37 receives the positions pressed from the tablet 2.

In step S14, the conversion section 43 obtains the affine transformation function to convert the pressed reference points into the coordinates in the [Terminal number, tag position printing coordinate] list 6.

After that, the affine transformation function is used to correct the deviation at the position collation section 37 and then work procedure is conducted.

Figure 9:
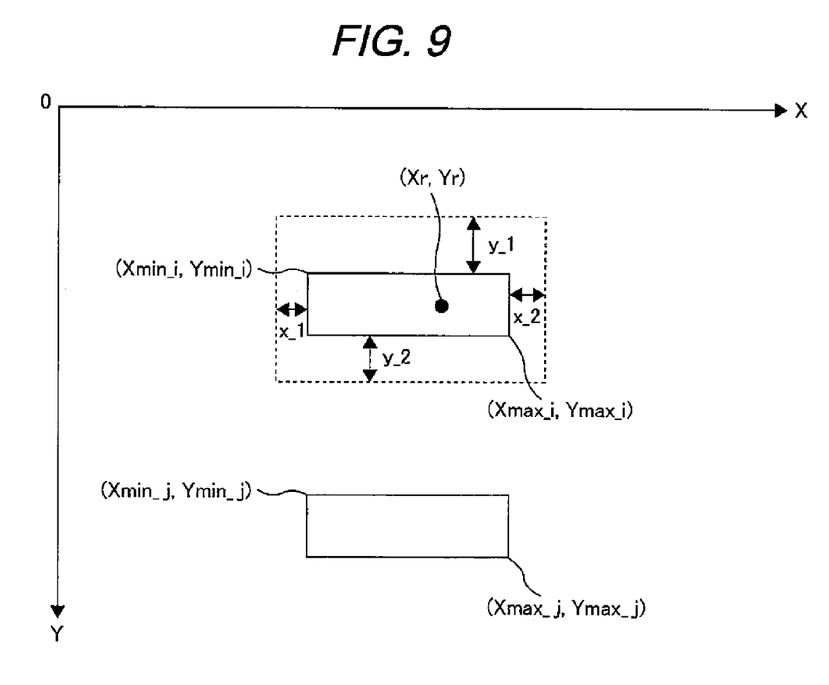
FIG. 9 is an explanatory view showing an example of a position alignment process specifying a margin executed by a position collation section.

FIG. 9 shows a example of the position alignment process specifying a margin executed by the position collation section 37. Even by the above position aligning method, there is a concern that deviation could occur when affixing an RFID on the base sheet 1. Accordingly, if a certain margin $x_{\_1}$, $x_{\_2}$, $y_{\_1}$, $y_{\_2}$ is provided for the position listed in the [Terminal number, tag position printing coordinate] list 6 and the position collation section 37 judges whether or not (Xr,Yr) or (Xr',Yr') is within the rectangle area of (Xmin_i-$x_{\_1}$, Ymin_I-$y_{\_1}$)(Xmax_i+$x_{\_2}$,Ymax_i+$y_{\_2}$), correct judgment can be executed even if there is a slight deviation. However, unless the margin is specified so that it does not overlap with the area of the adjacent RFID tag, incorrect judgment could be made by confusing with the adjacent tag area. Thus, it is possible to cope with the deviation of the pasted position.

Figure 10:
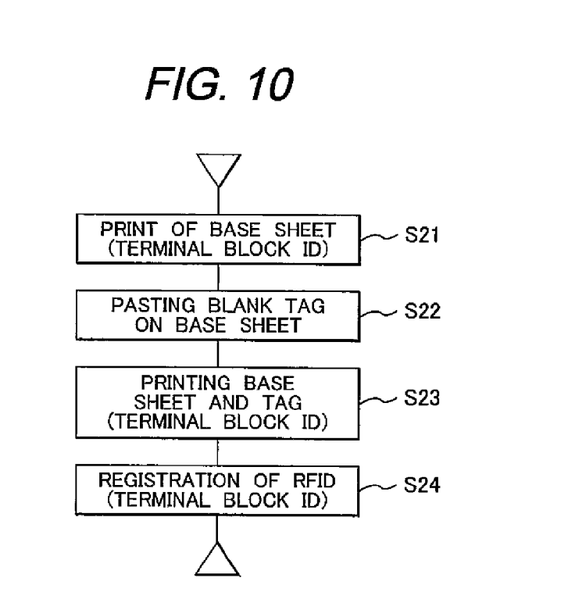
FIG. 10 is a flowchart showing a process for efficiently affixing a printing tag to a base sheet.

FIG. 10 shows the process of efficiently affixing a printing tag to the base sheet 1. As shown in FIG. 3, when affixing the RFID tags 28 having a terminal number printed thereon to the base sheet 1, if the printed tags 28 are affixed, in a case where many different tags 28 exist, a wrong tag containing different printed contents could be pasted. Accordingly, to prevent that mistake and efficiently paste the tag, the procedure may be conducted according the process shown in FIG. 10.

Figure 11:
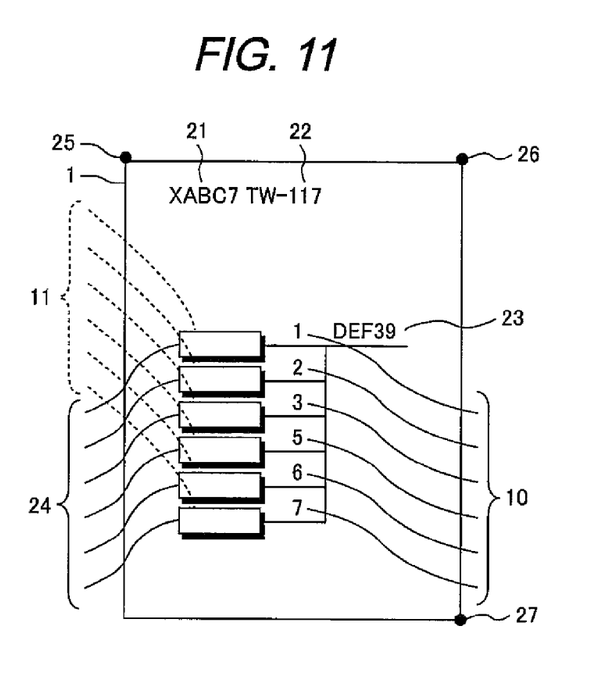
FIG. 11 is an explanatory view showing an example where a blank RFID tag is affixed to a base sheet before printing.

In step S21, the base sheet (terminal block ID) 1 is printed, and in step S22, a blank tag is affixed on the base sheet 1. The result is shown in FIG. 11. In step S23, the base sheet 1 and the tag 28 are printed (terminal block ID). Herein, a page printer is used so that ink drops on the tag position on the base sheet 1 to print each character. In this procedure, if the panel number 21 and the terminal block number 22 are printed again to overlap or place in parallel with the panel number 21 and the terminal block number 22 printed when the base sheet 1 was printed, it is easily shown whether those panel numbers 21 and terminal block numbers 22 printed twice are identical or not, thereby preventing errors. The result of printing twice is shown in FIG. 3. According to this system, the procedures are definitely quicker than the procedures conducted by an operator who checks the printed contents and pastes the tag 28 in a predetermined position. Subsequently, in step S24, the RFID is registered (terminal block ID). That is, the process is conducted by the system illustrated in FIG. 1 and the like.

FIG. 11 shows an example where a blank RFID tag is pasted on the base sheet 1 before printing.

Figure 12:
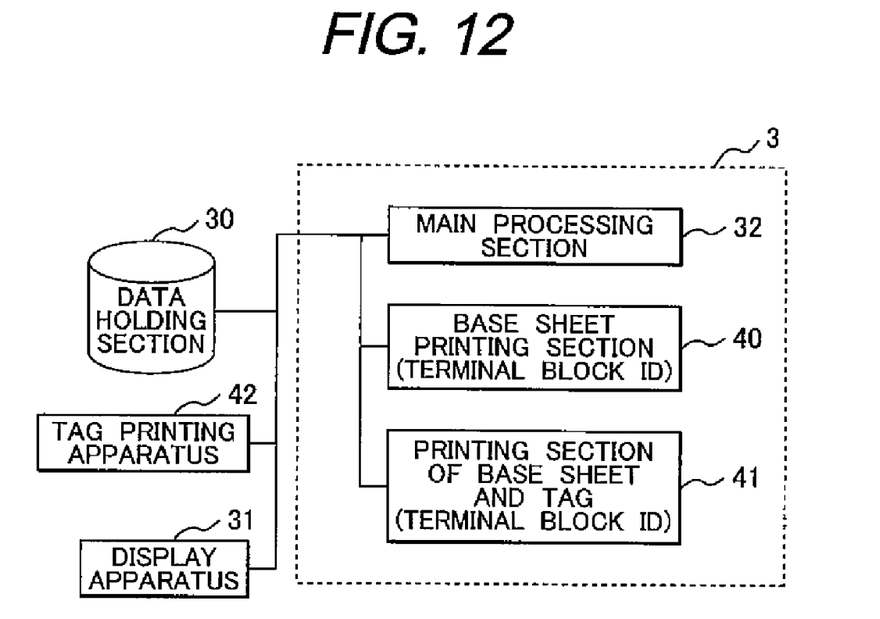
FIG. 12 is an explanatory view showing a configuration for efficiently affixing a printing tag to a base sheet.

FIG. 12 illustrates the configuration that enables a printing tag to be efficiently pasted on the base sheet 1. The main processing section 32 executes main processing of the system. When the main processing section 32 inputs a start command of the program, and specification of a menu, the program will proceed to the printing menu for printing the base sheet 1 or printing both the base sheet 1 and the tag 28. When receiving a terminal block ID, a base sheet print section 40 executes the processing of the step S21 shown in FIG. 10. The printing section 41 of printing the base sheet and the tag inputs the terminal block ID and executes the processing of the step S23 shown in FIG. 10. Also, printing is conducted by a tag printing apparatus 42. These configurations can be included in the same personal computer 3 which is located in the configuration portion related to the RFID registration system shown in FIG. 4, or may be included in different personal computers.

According to the RFID registration system of the present embodiment, it is possible to avoid associating a wrong pair, thereby increasing the reliability.

[Embodiment 2]

Figure 13:
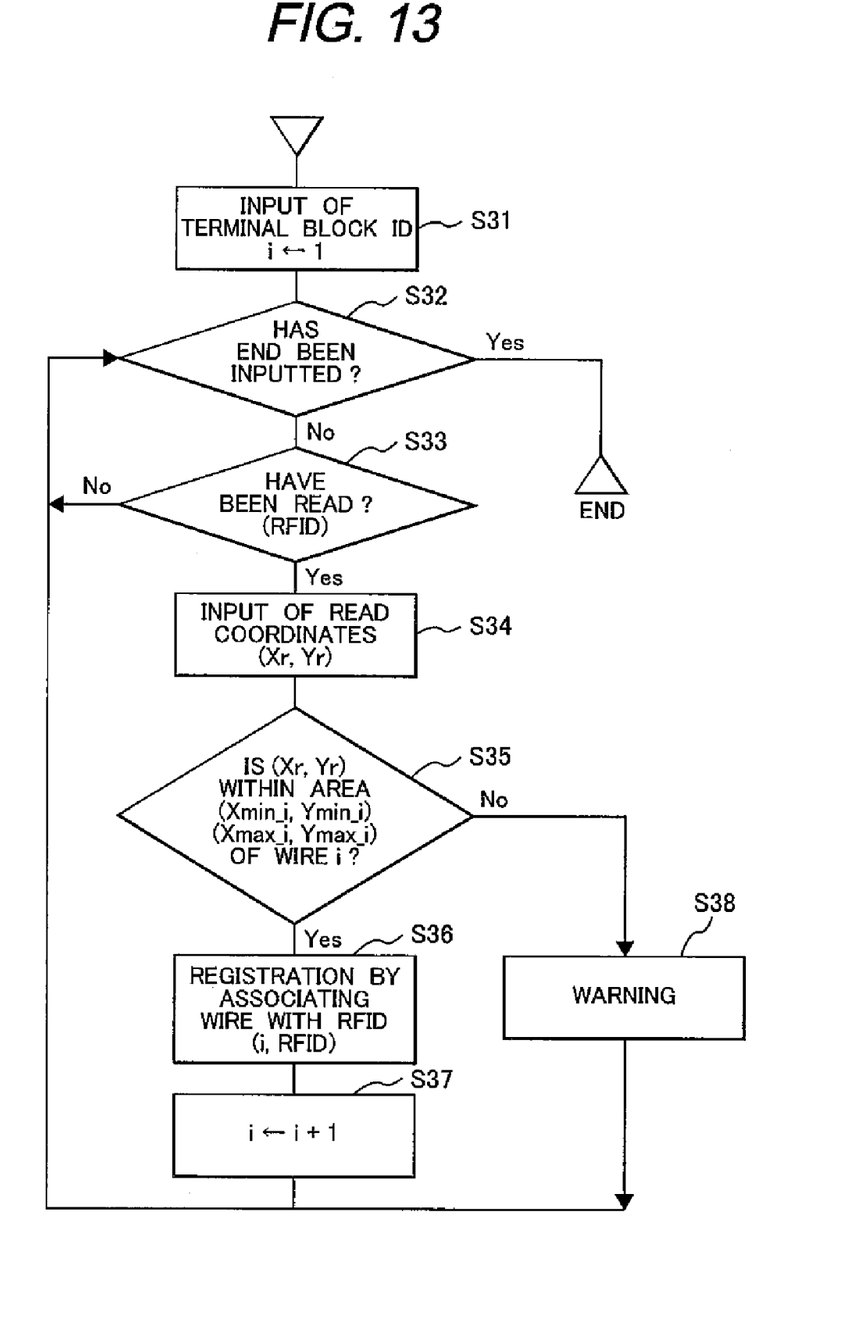
FIG. 13 is a flowchart showing a process of registering an RFID according to Embodiment 2, which is another embodiment of the present invention.

A method for registering an RFID according to Embodiment 2, which is another embodiment of the present invention, will be described with reference to FIG. 13. In the present embodiment, the RFID registration system shown in FIGS. 1 and 4 is also used as hardware, and performs the process of registering a value of an RFID shown in FIG. 13. In this process for registering an RFID shown in FIG. 13, the RFIDs are registered in sequential order by which wire number i was specified on the system side.

In step S31, the terminal-block-ID specifying section 33 inputs a terminal block ID. Assuming that wire number i=1 to I, the wire number i is set at an initial value of 1, and if the wire number i exceeds I in step S32, the process will end.

In step S33, the processing performed in the step S3 shown in FIG. 5 is performed, and in step S34, the processing performed in the step S4 shown in FIG. 5 is performed.

In step S35, the position collation section 37 checks to see whether (Xr,Yr) is (Xmin_i,Ymin_i)(Xmax_i,Ymax_i) within the area of wire i.

When determination of step S35 is Yes, the associating section 34 associates the wire i with the RFID and registers the wire i associated with the value of the RFID in the data holding section 30 (step S36). In step S37, the main processing section 32 updates the wire i.

When determination of step S35 is No, in step S38, the main processing section 32 generates warning information in order to warn the operator that the read RFID position is different from the position of the wire I, and displays the warning information on the display apparatus 31. At the time, the main processing section 32 does not register the wire i.

According to the present embodiment, the order of association has been determined beforehand, and operation procedures can be conducted as prescribed beforehand. Consequently, it is possible to prevent human errors, and also, if the associated relation is not correct, a warning is made, thus, reliability is further increased.

INDUSTRIAL APPLICABILITY

Other than the cable connection support application, the present invention can be applied to an ordinary system that uses an RFID.

REFERENCE SIGNS LIST

1: base sheet, 2: tablet, 3: personal computer, 4: reader, 6: [Terminal number, tag position printing coordinate] list, 7: [Wire number, RFID] list.

What is claimed is:

1. A RFID registration system comprising:
a storage apparatus for storing a list in which an ID of an object to be identified by said RFID associated with an ID position indicating a preset position of said object in a coordinate system of a position information generation apparatus,
a read apparatus for reading said RFID of a selected object physically positioned in the coordinate system of the position information generation apparatus,
a position information generation apparatus for providing position information of said selected object read by said read apparatus,
a collation apparatus for collating said position information provided by said position information generation apparatus with said ID position stored in said storage apparatus, and obtaining said ID of said selected object, and
an association apparatus for associating said ID of said selected object collated by said collation apparatus, with said RFID read by said read apparatus, and storing said ID of said selected object and said RFID associated together.

2. The RFID registration system according to claim 1, further comprising:
an ID specification apparatus for specifying an ID of said object to be identified by said RFID, and
a warning apparatus for generating warning when said ID of said object specified by said ID specification apparatus is different from said ID of said object, obtained by said collation apparatus.

3. The RFID registration system according to claim 1, wherein said collation apparatus has a conversion apparatus for obtaining a deviation between said position information and said ID position, adjusting said deviation, and obtaining said ID of said object.

4. The RFID registration system according to claim 1, further comprising:
an existence position printing apparatus for printing said ID position, and
a printing apparatus for printing said RFID placed on said ID position by said existence position printing apparatus.

5. An RFID registration method comprising:
storing, within a storage apparatus, a list in which an ID of an object to be identified by said RFID is associated with an ID position indicating a preset position of said object in a coordinate system of a position information generation apparatus,
reading said RFID of a selected object physically positioned in the coordinate system of the position information generation apparatus,
providing, via said position information generation apparatus, position information of said selected object read by said read apparatus,
collating said position information provided by said position information generation apparatus with said ID position stored in said storage apparatus, and obtaining said ID of said selected object, and
associating said ID of said selected object collated by said collating, with said RFID read by said reading, and storing said ID of said selected object and said RFID associated together.

6. The RFID registration method according to claim 5, further comprising:
specifying an ID of said object to be identified; and
generating warning when said ID specified in said specifying is different from said ID of said object obtained in said obtaining the ID of said object to be identified.

7. The RFID registration method according to claim 5, further comprising:
obtaining a deviation between the position information obtained in said obtaining a position read and the ID position stored in said storage apparatus,
adjusting the deviation, and
obtaining said ID of said object.

8. The RFID registration method according to claim 5, further comprising:
printing said ID position stored in said storage apparatus, and
printing the RFID placed on said printing position in said printing.

9. A RFID registration system comprising:
a storage apparatus configured to store, prior to a RFID-reading from plural objects, a list associating, for each object of the plural objects, an object ID and an ID position, in which the object ID is an ID of the object available for association with a read-RFID, and the ID position indicates a preset physical position planned for the object positioned in a coordinate system of a position information generation apparatus,
a read apparatus configured to read a RFID provided on a selected object actually positioned in the coordinate system of the position information generation apparatus,
the position information generation apparatus configured to output position information of the selected object,
a collation apparatus configured to collate the position information output by the position information generation apparatus, with each said ID position stored in the storage apparatus, to obtain a determined object ID having the ID position which collates with the position information, and
an association apparatus configured to associate and store the determined object ID of the object collated by the collation apparatus, together with the RFID read by the read apparatus, to register the determined object ID of the object together with the RFID.

* * * * *